US008416720B2

(12) United States Patent
Hiben et al.

(10) Patent No.: US 8,416,720 B2
(45) Date of Patent: Apr. 9, 2013

(54) PEER-TO-PEER WIDE AREA COMMUNICATIONS SYSTEM

(75) Inventors: Bradley M. Hiben, Glen Ellyn, IL (US); Bob D. Logalbo, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 897 days.

(21) Appl. No.: 11/758,729

(22) Filed: Jun. 6, 2007

(65) Prior Publication Data

US 2008/0305791 A1 Dec. 11, 2008

(51) Int. Cl.
*H04B 7/00* (2006.01)

(52) U.S. Cl.
USPC ........................................ 370/310; 455/435.1

(58) Field of Classification Search ............... 370/310, 370/335, 342, 441; 455/435.1, 433, 432.1, 455/432.3
See application file for complete search history.

(56) References Cited

U.S. PATENT DOCUMENTS

| 7,263,351 B2 | 8/2007 | Ross et al. |
| 2006/0056361 A1 | 3/2006 | Jiang et al. |

FOREIGN PATENT DOCUMENTS

| EP | 1926333 A | 5/2008 |
| RU | 2005102405 C2 | 4/2008 |
| WO | 03015431 A | 2/2003 |
| WO | 2007019730 A | 2/2007 |

OTHER PUBLICATIONS

Guha, Saikat et al.: An Experimental Study of the Skype Peer-to-Peer VoIP System, Cornell University, http://techreports.library.cornel.edu:802011, http://dspace.library.cornell.edu/handle/1813/5711, Dec. 16, 2005, 6 pages.
TIA TSB: "Inter-RF Subsystem Interface Messages Interface—New Technology Standards Project—Digital Radio Technical Standards; TSB-102.BACA", Telecommunications Industry Association 1996—reaffirmed by Telecommunications Industry Association Apr. 2, 2003, XP017004795, pp. 28-37.
"Project 25 Inter-RF Subsystem Interface Messages and Procedures for Voice Services; TIA-102.BACA" EIA/TIA Standards, Telecommunications Industry Associations, Arlington, VA, US, Aug. 1, 2006, pp. 1-328, XP017005565.
English Language Translation of Russian Office Action mailed on Feb. 1, 2011 in Application No. 2009149344/09 filed on May 29, 2008.
English Language Translation of Russian Notice of Allowance mailed on Jul. 22, 2011 in Application No. 2009149344/09 filed on May 29, 2008.
English Language Translation of Australian Office Action mailed on Dec. 10, 2010 in Application No. 2008262144.

(Continued)

*Primary Examiner* — Charles Appiah
*Assistant Examiner* — Alexander Yi
(74) *Attorney, Agent, or Firm* — Simon B. Anolick; Valerie M. Davis; Kenneth A. Haas (57) ABSTRACT

A method (200, 300) for supporting telecommunications over a wide area network. The method can include receiving a first message from a first communications site (110), the first message communicated through a logical port (174) at the communications site and maintaining the logical port open for at least a minimum period. A second message can be received from a second communications site (112), the second message requesting an identifier associated with the first communications site. Further, a third message can be communicated to the first communications site through the logical port. The third message can identify the second communications site as a candidate for establishing a peer-to-peer communications link over which telecommunications content may be communicated to a first remote unit (104).

17 Claims, 3 Drawing Sheets

OTHER PUBLICATIONS

English Language Translation of Australian Office Action mailed on Jun. 9, 2011 in Application No. 2008262144.

International Search Report and Written Opinion mailed on Oct. 15, 2008 for International Application No. PCT/US2008/065032.

International Preliminary Report on Patentability dated Dec. 7, 2009 for International Application No. PCT/US2008/065032.

PEER-TO-PEER WIDE AREA COMMUNICATIONS SYSTEM

BACKGROUND OF THE INVENTION

1. Field of the Invention

The present invention generally relates to communications over a wide area network and, more particularly, to telecommunications.

2. Background of the Invention

Multi-site land mobile radio systems are well known. They are primarily utilized to provide emergency communications to police officers, fire fighters and other emergency responders. These systems typically utilize leased communication lines to interconnect radio repeater sites with a central call control server. The recurring costs of the leased communication lines, as well as the capital investment required for the radio repeater sites and specialized call control server, result in relatively high system costs. Accordingly, these systems are typically exclusively owned and operated by governmental agencies.

Professional and commercial entities, such as retail chains, school systems and construction companies, also may benefit from the use of multi-site land mobile radio systems but, due to the recurring costs and the required capital investment, generally do not deploy such systems. Indeed, companies who operate over large geographic areas or in different regions may require hundreds or even thousands of radio repeater sites to implement a suitable multi-site land mobile radio system. Moreover, such a system would require multiple central call servers, which themselves would need to be connected over leased lines, thus creating significant additional operational expenses.

SUMMARY OF THE INVENTION

The present invention relates to a method for supporting telecommunications over a wide area network. The method can include receiving a first message from a first communications site, the first message communicated through a logical port at the communications site and maintaining the logical port open for at least a minimum period. A second message can be received from a second communications site, the second message requesting an identifier associated with the first communications site. Further, a third message can be communicated to the first communications site through the logical port. The third message can identify the second communications site as a candidate for establishing a peer-to-peer communications link over which telecommunications content may be communicated to a first remote unit.

The method also can include receiving a first message from a first communications site, the first message requesting at least one address associated with at least a second communications site that is associated with a call group from which a first remote unit has requested to receive telecommunications content. A second message can be received from the first communications site. The second message can include the at least one address and can request a connection to at least a second remote unit associated with the call group. At least a third message can be communicated to the at least second communications site requesting a distribution reservation for telecommunications content generated by the at least second remote unit.

The method further can include communicating a first message from a first communications site, the first message communicated through a logical port at the communications site. A second message can be received at the first communications site through the logical port, the second message maintaining the logical port open for at least a minimum period. The method also can include receiving through the logical port a third message from an intermediary. The third message can include an identifier associated with a second communications site with which a first remote unit has become affiliated. In addition, a fourth message can be communicated to the second communications site, the fourth message requesting registration of the first communications site with the second communications site and establishing a peer-to-peer communications link over which telecommunications content is communicated to the first remote unit.

The method also can include, at a second communications site, receiving from a first remote unit a first message requesting affiliation with the second communications site, the first remote unit having a first communications site as its home communications site. Further, a second message can be communicated to the first communications site, the second message indicating that the first remote unit requests to receive telecommunications content communicated by members of at least one call group.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
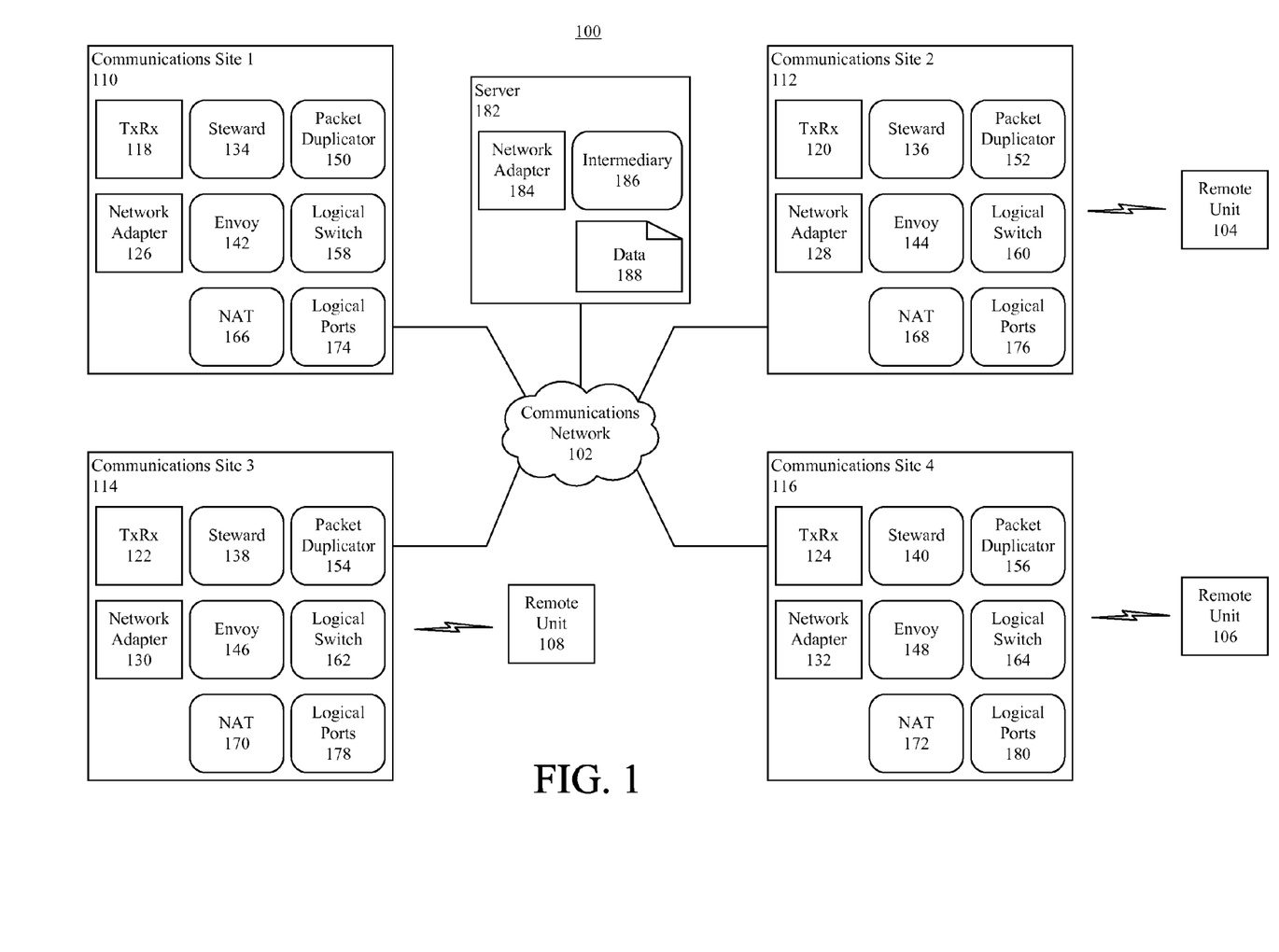
FIG. 1 depicts a communications system that is useful for understanding the present invention.

FIG. 1 depicts a communications system 100 that is useful for understanding the present invention. The communications system 100 can include a communications network 102, which may comprise a wide area network (WAN), such as the Internet, the World Wide Web, a dispatch communications network, an interconnect communications network (e.g. a cellular communications network), a public switched telephone network (PSTN), and the like. The communications network also may comprise one or more local area networks (LANs), one or more metropolitan area networks (MANs), and/or any other networks or systems over which communication signals can be propagated. In that regard, the communications network 102 can include wired and/or wireless communication links.

The communications system 100 can include a plurality of remote units 104, 106, 108 which communicate via the communications network 102. The remote units 104-108 can be, for instance, mobile stations (e.g. mobile telephones, mobile radios, mobile computers, personal digital assistants, or the like), computers, wireless gaming devices, access terminals, subscriber stations, user equipment, or any other devices suitably configured to communicate via a wireless communications network. As such, the remote units 104-108 can comprise one or more processors/controllers, transceivers, and/or other suitable components.

In one arrangement, the remote units 104-108 can scale and sum audio information received from a plurality of audio sources (e.g. audio received from a plurality of other remote units during a group call or conference call). In an arrangement in which the remote units 104-108 receive a plurality of video signals, for example during a group call or conference call, the remote units 104-108 can present the video signals independently, for example by presenting each video signal in a different portion of a display or by switching between the video signals.

The remote units 104-108 can access the communications network 102 via communications sites 110, 112, 114, 116. The communications sites 110-116 each can include one or more respective transceivers 118, 120, 122, 124 to support communications with the remote units 104-108. The transceivers 118-124 can modulate and demodulate signals to convert signals from one form to another, and can transmit and/or receive such signals over one or more various wireless communication links. In illustration, the transceivers 118-124 can be configured to communicate data via IEEE 802 wireless communications, for example, 802.11 and 802.16 (WiMAX), WPA, or WPA2. In another example, the transceivers 118-124 can communicate data via GSM, TDMA, CDMA, WCDMA, OFDM, or direct wireless communication. Moreover, in one arrangement, one or more of the transceivers 118-124 can communicate with the remote units 104-108 using a personal radio service, for instance in accordance with the guidelines established by the U.S. Federal Communications Commission (FCC) for the General Mobile Radio Service (GMRS) and/or the Family Radio Service (FRS), although the invention is not limited in this regard.

Each of the communications sites 110-116 also can include one or more respective network adapters 126, 128, 130, 132. The network adapters 126-132 can comprise, for example, communications modems, wired and/or wireless transceivers, and/or any other devices that may suitably communicate data over the communications network 102. Via the network adapters 126-132, the communications sites 110-116 can communicate with a server 182 and with one another over the communications network 102.

Each of the communications sites 110-116 further can include a telecommunications steward (hereinafter "steward") 134, 136, 138, 140, a telecommunications envoy (hereinafter "envoy") 142, 144, 146, 148, a packet duplicator 150, 152, 154, 156, a logical switch 158, 160, 162, 164, a network address translator (NAT) 166, 168, 170, 172, and logical ports 174, 176, 178, 180.

The stewards 134-140 can support telecommunications for remote units 104-108 whose home communications sites are the communications sites with which the stewards 134-140 are associated, regardless of where the remote units 104-108 have established network presence. For example, if the communications site 110 is the home communications site for the remote unit 104, the steward 134 can support call processing for the remote unit 104, even while the remote unit 104 is roaming outside the service area of the communications site 110.

Each of the stewards 134-140 can maintain network presence information for their respective remote units 104-108. For example, when the remote unit 104 hands over to, or otherwise establishes network presence at, the communications site 112, information about such event can be communicated to the steward 134. The information can be communicated by the remote unit 104, the communications site 112, or by any other suitable component of the communications system 100. Accordingly, when the communications site 110 receives telecommunications content addressed to the remote unit 104, the steward 134 can forward such content to the communications site 112, which can transmit the content to the remote unit 104 via the transceiver 120.

The envoys 142-148 can broker call setup between the remote units 104-108 and the home stewards 134-140 with which the remote units 104-108 are associated. In contrast to the stewards 134-140, the services provided by the envoys 142-148 can be location dependent. That is, the envoy 142 can broker call setup for any remote units 104-108 that become affiliated with the communications site 110 (e.g. establish network presence at the communications site 110), the envoy 144 can broker call setup for any remote units 104-108 that become affiliated with the communications site 112, and the envoy 146 can broker call setup for any remote units 104-108 that become affiliated with the communications site 114, and so on. For instance, if the remote unit 104 has become affiliated with the communications site 112 and the remote unit's home site is communications site 110, the envoy 144 can broker call setup between the remote unit 104 and its home steward 134. The envoys 142-148 can broker call setup between the remote units 104-108 and the stewards 134-140 by forwarding call setup information to the stewards 134-140. The call setup information can include, for example, identifiers received from the remote units 104-108 that identify one or more call groups with which the remote units 104-108 wish to communicate. In the call setup information, the call group can be represented by a single group identifier or a list of one or more call recipients.

The packet duplicators 150-156 can be tasked with duplicating telecommunication content packets (hereinafter "packets") that have a plurality of intended recipients, and communicating such packets to the recipients. For example, assume that the remote unit 104 transmits a packet containing telecommunications content and identifies the remote units 106, 108 as intended recipients of the packet. The remote unit 104 can communicate such packet to its home steward 134 (via the transceiver 120 and envoy 144). The steward 134 then can forward the packet and recipient identifiers to the packet duplicator 150. The packet duplicator 150 can duplicate the packet as may be necessary to communicate the packet to each of the remote units 106, 108 identified by the recipient identifiers.

A recipient identifier can be a telephone number, IP address, uniform resource locator (URL), or any other identifier suitable for identifying an intended recipient (e.g. remote unit 108) of the packet. In an arrangement in which the IP address or URL of a recipient's home steward (e.g. home steward 138) is known to the steward 134, the steward 134 also can communicate to the packet duplicator 150 the address of the recipient's home steward, which also can be an IP address, a URL, or any other suitable identifier.

The communications sites 110-116 also can include logical switches 158-164. The logical switches 158-164 can direct data to/from the appropriate resources within the respective communications sites 110-116. For instance, the logical switch 160 can direct data received by the transceiver 120 to the envoy 144. Similarly, the logical switch 160 can direct to the network adapter 128 data that is to be communicated by the communications site 112 over the communications network 102. Moreover, the logical switch 160 can direct data that is communicated among the various components 120, 128, 136, 144, 152 of the communications site 112.

The NATs 166-172 can implement network address translation and prevent unauthorized access to or from the respective communications sites 110-116. In some arrangements, the NATs can be implemented as components of respective firewalls (e.g. NAT-enabled firewalls), or respective firewalls can be used in lieu of the NATs 166-172. Accordingly, throughout this specification, any reference to a NAT should be understood to mean a NAT, a firewall, or a NAT-enabled firewall. The NATs 166-172 (or the respective firewalls) can selectively open and close the logical ports 174-180 on their respective communications sites 110-116. For example, the NAT 166 can selectively open a logical port 174 when the communications site 110 is communicating a message through the logical port 174, and the NAT 166 can maintain the logical port 174 open for a period of time to receive an acknowledgement or response to the message that was sent. If no further messages are communicated through the logical port 174 prior to expiration of the time period, the NAT 166 can close the logical port 174.

The server 182 also can be provided as a node within the communications system 100. The server 182 may comprise a network adapter 184, via which the server 182 communicates with the communications sites 110-116. The network adapter 184 can comprise a communications modem, wired and/or wireless transceiver, and/or any other device(s) that may suitably communicate data over the communications network 102.

The server 182 also can include an intermediary 186. The intermediary 186 can be configured to facilitate communications among the communications sites 110-116. For example, if the communications sites 110, 112 are protected by their respective NATs 166, 168, and the NATs 166, 168 prevent direct communication between the communications sites 110, 112, the intermediary 186 can provide a rendezvous point through which communications sites 110, 112 can communicate. Such process is described in greater detail with reference to FIG. 2.

Further, the intermediary 186 can receive a request from a system which is attempting to establish a communication session with one or more of the remote units 104-108, or a group of the remote units, but cannot directly access the remote units due to lack of knowledge of the current addresses and/or location of the remote units 104-108. When the intermediary 186 receives such a request, the intermediary 186 can access one or more data tables (or data files) 188 to retrieve relevant mapping information and provide such mapping information to a system associated with the request. Such process is described in greater detail with reference to FIG. 3. The data tables (or data files) 188 can be stored on a suitable data storage accessible by the server 182, for example, an electronic storage medium, a magnetic storage medium, an optical storage medium, a magneto-optical storage medium, and/or any other storage medium suitable for storing digital information.

The stewards 134-140, envoys 142-148, packet duplicators 150-156, logical switches 158-164, NATs 166-172, logical ports 174-180 and intermediary 186 can be realized in hardware, software, or a combination of hardware and software. For example, each of the components 134-180, 186 may represent a module, segment, or portion of code, which comprises one or more executable instructions for implementing the specified logical function(s). Further, the components 134-180, 186 can be instantiated in a centralized fashion in one processing system or in a distributed fashion where different elements are spread across several interconnected processing systems. Any kind of processing system or other apparatus adapted for carrying out the methods described herein is suited. Examples of such a processing system can include, but are not limited to, a personal computer, a mobile station, a server, a network appliance, and so on.

The software for implementing the methods described herein can be embedded in a program storage device readable by a machine, tangibly embodying a program of instructions executable by the machine to perform methods and processes described herein. The software also can be embedded in an application product which comprises all the features enabling the implementation of the methods described herein and, which when loaded in a processing system, is able to carry out these methods.

Moreover, it should be noted that the components depicted in FIG. 1 illustrate the architecture, functionality, and operation of possible implementations of the communications system 100 according to various embodiments of the present invention. Nonetheless, pursuant to the teachings contained herein, various modifications to the system and components described may become apparent to one skilled in the art. Any systems/components resulting from such modifications are within the intended scope of the present invention.

Figure 2:
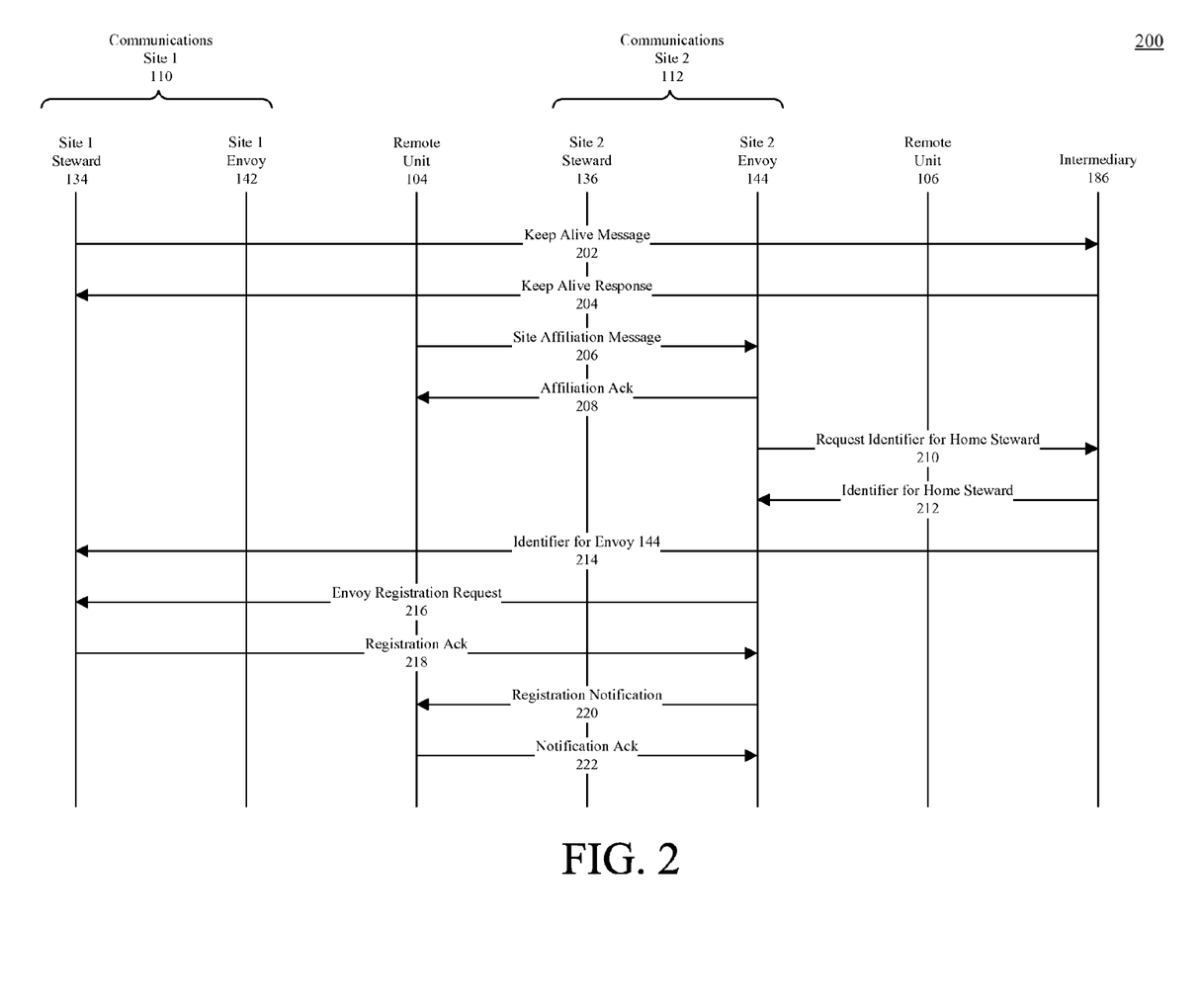
FIG. 2 depicts a signaling flow diagram that is useful for understanding the present invention.
Figure 3:
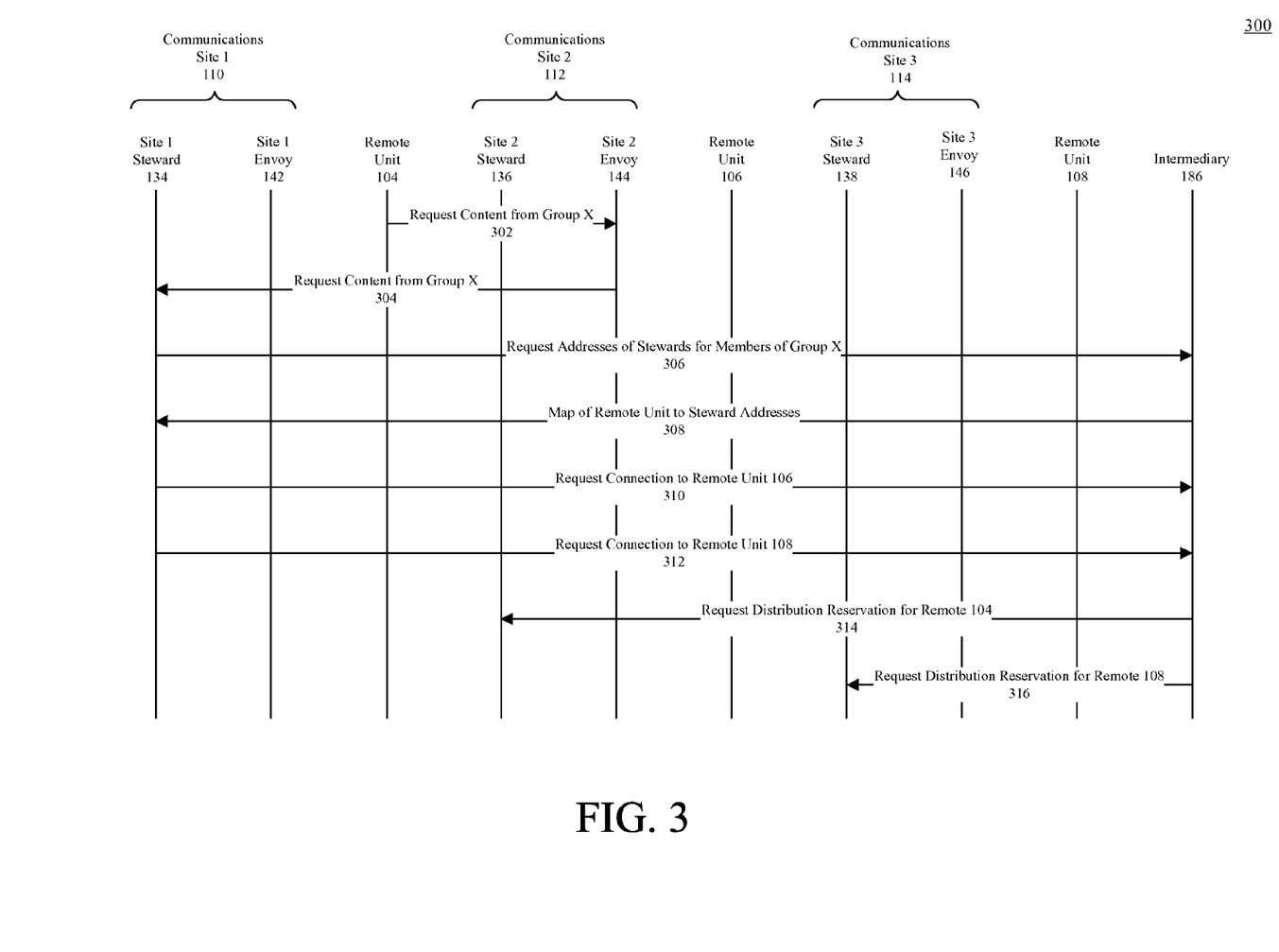
FIG. 3 depicts a signaling flow diagram that is useful for understanding the present invention.

FIG. 2 depicts a communications signaling flow diagram 200 and FIG. 3 depicts a communications signaling flow diagram 300, each of which is useful for understanding the present invention. The signaling flow diagrams 200, 300 depict the communication of data among the remote units, stewards, envoys and intermediary. The transceivers 118-124, network adapters 126-132, 184, packet duplicators 150-156, NATs 166-172, logical ports 174-180, communications network 102 and/or other system components can support the communication of such signals, but are not shown in the signaling flow diagram for the purpose of clarity.

Referring to FIG. 2, the signaling flow diagram 200 presents a method of affiliating the remote unit 104 with a communications site 112 that is not the remote unit's home site. The signaling flow diagram 200 can begin with the system in a state in which the first communications site 110 and the second communications site 112 are protected by their respective NATs, and such NATs normally keep closed the ports through which the steward 134 (of the first communications site 110) and the envoy 144 (of the second communications site 112) would otherwise receive communications from other communications sites. Also assume that the ports of the intermediary 186 are open to the stewards 134, 136 and envoys 142, 144 of the respective communications sites 110, 112.

Beginning at step 202, the steward 134 of the communications site 110 can communicate a "keep alive" message to the intermediary 186. The keep alive message can be communicated in response to an event, such as activation of the communications site 110 or a user input, or the communications site 110 can be configured to periodically communicate the keep alive message.

The keep alive message can comprise a packet that is communicated to the intermediary 186 which, when sent, results in the opening of a logical port on the communications site 110. The logical port can be the logical port through which the steward 134 also may communicate with the envoy 144. The communications site's NAT can be configured to keep the logical port open for a minimum period of time after the keep alive message has been sent. The minimum period of time can be long enough to insure that the logical port is still open when a response to the keep alive message is received from the intermediary at step 204. The period of time can last microseconds, milliseconds, seconds, minutes, hours, or any other desired time period.

The response to the keep alive message can be received by the communications site 110 through the same logical port that was opened for sending the keep alive message, and the communications site's logical switch can direct the response to the steward 134. The communications site's NAT also can be configured to keep the logical port open for a minimum period of time after the response to the keep alive message has been received. In one arrangement, a next keep alive message can be sent while the logical port remains open, and the process can repeat to keep the logical port open while desired. For example, the process can repeat for a predetermined period, while the communications site 110 remains activated, while the remote unit 104 remains activated, while an application remains instantiated on the communications site 110, or the like.

At step 206, the remote unit 104 can communicate a site affiliation message to the envoy 144, for instance in response to the remote unit 104 roaming into a service area serviced by the communications site 112. The site affiliation message 206 can identify the remote unit 104, as well as provide any information required for authentication of the remote unit 104 at the communications site 112. In one arrangement, the site affiliation message 206 also can identify the home steward 134 of the remote unit 104. For instance, the site affiliation message 206 can provide an identifier, IP address or URL associated with the steward 134.

Optionally, the site affiliation message also can provide an identifier, IP address or URL associated with the intermediary 186, an identifier, IP address or URL associated with the remote unit 104, and/or a service type identifier. The service type identifier can specify a type of telecommunications content being communicated and restrictions associated with that content type, codecs available for processing telecommunications content, system bandwidth and throughput requirements and restrictions, and/or a group affiliation identifier. The site affiliation message also can identify the last envoy to which the remote unit 104 was connected. In addition, a list of one or more envoy identifiers can be included in the site affiliation message, as well as the estimated wireless communications uplink and downlink qualities and estimated data throughput between such envoys and the remote unit 104.

At step 208 the envoy 144 can respond to the site affiliation message with an affiliation acknowledgment that indicates that the remote unit is now affiliated with the communications site 112.

In an arrangement in which the site affiliation message does not identify the home steward 134 of the remote unit 104, at step 210 the envoy 144 can communicate a message to the intermediary 186 requesting an identifier (e.g. IP address or URL) for the remote unit's home steward 134. The message also can include an identifier associated with the envoy 144. At step 212 the intermediary 186 can respond to the message with an acknowledgement that includes the identifier of the steward 134.

In an arrangement in which the site affiliation message does identify the home steward 134 of the remote unit 104, the message communicated at step 210 can indicate that the remote unit 104 is affiliated with (e.g. has established network presence at) the communications site 112, as well as the identifier for the envoy 144. Such message also can identify the steward 134 to the intermediary 186, or the intermediary 186 can access the identifier for the steward 134 from a data table or data file by identifying the home steward that is associated with the remote unit 104. At step 212 the intermediary 186 can acknowledge the request received at step 210. Optionally, the acknowledgement can indicate to the envoy 144 the logical port that was previously opened on the communications site 110 at steps 202 and 204.

Regardless of the information that is communicated between the envoy 144 and the intermediary 186 at steps 210 and 212, such messages can open a logical port on the communications site 112 and keep the logical port open for a period in a manner similar to that previously described for the message and response communicated between the steward 134 and intermediary 186 in steps 202 and 204. Alternatively, a keep alive message can be communicated from the envoy 144 to the intermediary 186, and a response to the keep alive message can be communicated from the intermediary 186 to the envoy 144.

At step 214 the intermediary 186 can communicate to the steward 134 a message that identifies the envoy 144 as being associated with the communications site 112 where the remote unit 104 has established presence, and thus a candidate for establishing a communications link over which telecommunications content may be communicated to and from the remote unit 104. The message can include an identifier (e.g. IP address or URL) that is associated with the envoy 144. The message also can identify the logical port at the communications site 112 that was previously opened, for example as described at steps 210 and 212. The message can be communicated through the logical port previously opened on the communications site 110, for instance as described in steps 202 and 204.

The message also can include the list envoys originally communicated to the intermediary 186 in the site affiliation message, as well as the estimated wireless communications uplink and downlink qualities and estimated data throughput between the envoys and the remote unit 104. Based on this information, the steward 134 can select the optimal types of telecommunication services provided to the remote unit 104 to those which, based on the quality/data throughput information, may be suitably communicated to the remote unit 104. In an arrangement in which certain allowable service types require more than one logical port to be opened at the communications site 110 and/or communications site 112, knowledge of such service types can be used to open the appropriate logical ports.

At step 216 the envoy 144 can communicate a message to the steward 134 requesting registration of the communications site 112 with the communications site 110. For instance, the message can request registration of the envoy 144 with the steward 134. This message also can be communicated through the logical port previously opened at the communications site 110. The envoy registration request can include an opcode that identifies the envoy 144 and the remote unit 104, and specifies that the envoy 144 would like to establish a connection at the behest of the remote unit 104.

At step 218 the steward 134 can communicate a message to the envoy 144 to acknowledge registration of the communications site 112 with the communications site 110. The message also can identify to the envoy 144 the logical port that is open on the communications site 110 through which the envoy 144 may communicate with the steward 134. The message can be communicated from the steward 134 to the envoy 144 through the logical port previously opened at the communications site 112. Further, the steward 134 and envoy 144 can send keep alive messages to one another to keep open the logical ports on the communications sites 110, 112 through which the steward 134 and envoy 144 communicate, and thereby allowing a peer-to-peer communications link between the communications sites 110, 112.

As used herein, a "peer-to-peer communications link" is a communications link between peer nodes of a communications network which does not rely on a central call control server for transporting packets between the peer nodes. Because a central call control server and leased communication lines are not required, costs associated with deployment and maintenance of such systems can be avoided. Moreover, with less of a reliance on a centralized infrastructure, network architecture that implements peer-to-peer networking can be very scalable.

Over the peer-to-peer communications link, the envoy 144 can broker call setup between the remote unit 104 and the steward 134, for example as previously described. Telecommunications content also can be communicated to and from the remote unit 104 over the peer-to-peer communications link. For example, the steward 134 can route to the envoy 144 telecommunications content being communicated to the remote unit 104. The steward 134 also can route to the appropriate communications site 110, 112 telecommunications content generated by the remote unit 104, which the steward 134 may receive via the envoy 144.

At step 220, the envoy 144 can communicate a registration notification message to the remote unit 104 indicating that the envoy 144 and steward 134 are registered with one another. Proceeding to step 222, the remote unit 104 can respond to the envoy 144 with an acknowledgement to such notification. At this point the network presence of the remote unit 104 will be affiliated with the communications site 112, and thus can send and receive telecommunications content via the communications site 112, the communications site 110, and the peer-to-peer communications link established between the communications sites 110, 112, as well as other peer-to-peer communications links established within the communications network.

Referring now to FIG. 3, the signaling flow diagram 300 presents a method for supporting peer-to-peer group calls among a plurality of remote units. The signaling flow diagram 300 can begin with the system in a state in which the remote unit 104, whose home communications site is communications site 110, has established network presence at the communications site 112. It also may be assumed that keep alive messages, as described in FIG. 2, have been communicated between the intermediary 186 and the respective stewards 134-138 to maintain an open logical port on each of the stewards 134-138 through which the intermediary can communicate messages.

Beginning at step 302, the remote unit 104 can communicate a message to the envoy 144 of the communications site 112. The message can indicate that the remote unit 104 requests to receive telecommunications content communicated by members of one or more particular call groups, for example "group X". At step 304 the envoy 144 can forward the message to the remote unit's home steward 134, for example over the peer-to-peer communications link previously described.

At step 306 the steward 134 can send a message to the intermediary 186 requesting the addresses of the home stewards for the members of the group X. For instance, in an arrangement in which the steward 134 has access to a listing of the members that belong to group X, the steward 134 can communicate to the intermediary 186 identifiers that are associated with the members of the group. The identifiers can be identifiers that are associated with the remote units, for instance user or remote unit identifiers. In another arrangement, the steward 134 can communicate an identifier representing the group, and the intermediary 186 can identify the members of the group by accessing data from a data storage which maps the group members to a group identifier. Regardless of how the members of the group are identified to the intermediary 186, the intermediary 186 can access data that maps identifiers associated with the remote units 104-108 to their home stewards 134-138. At step 308 the intermediary 186 can communicate the mapping data to the steward 134. For example, if the members of the group include the remote units 106, 108, the mapping data can associate the remote unit 106 with the steward 136 and the remote unit 108 with the steward 138.

At step 310 the steward 134 can communicate a message to the intermediary 186 requesting connection to the remote units 106, 108. Such message can indicate the home steward 136 of the remote unit 106. Similarly, at step 312 the steward 134 can communicate to the intermediary 186 a message requesting connection to the remote unit 108, and such message can indicate the home steward 138 of the remote unit 108.

In one arrangement, in lieu of the steward 134 sending multiple messages requesting connection to the remote units 106, 108, the requests communicated at steps 310 and 312 can be communicated in a single message. Moreover, such requests can be communicated in the message sent to the intermediary at step 306. In such an arrangement, the steward 134 may not need to request the addresses of the home stewards for the members of the group. Instead, the message sent at step 306 can indicate a request to connect to each member of the group, and the intermediary 186 can access a data storage to identify the home stewards of the group members.

Proceeding to step 314, the intermediary 186 can communicate a message to the steward 136 to request a distribution reservation for telecommunications content generated by the remote unit 106. The distribution reservation can be communicated through an open logical port at the communications site 112, such as a port maintained open by keep alive messages previously described. The distribution reservation can identify the remote unit 106, as well as the remote unit 104 and/or the steward 134. Similarly, at step 316 the intermediary 186 can communicate a message to the steward 138 to request a distribution reservation for telecommunications content generated by the remote unit 108. Such distribution reservation can identify the remote unit 108, as well as the remote unit 104 and/or the steward 134. Such distribution reservation also can be communicated through an open logical port at the communications site 114.

The stewards 136, 138 can process the respective distribution reservations such that when the respective remote units 106, 108 generate telecommunications content to group X, such content may be automatically communicated to the home steward 134 of the remote unit 104, which may then forward the telecommunications content to the remote unit 104 via the envoy 144. In addition to the stewards 136, 138, the packet duplicators, envoys, and other components can be used to process the telecommunications content in accordance with their designated functionality.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

As used herein, the term "telecommunications content" refers to content that may be communicated during a call session. Such content can include, audio content, video content, multimedia content, text, or any other information that may be communicated during the call session. Further, the call session can be a dispatch call session (e.g. half duplex) or an interconnect call session (e.g. full duplex).

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/ dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method for supporting telecommunications over a wide area network, comprising: at a server located between a first and a second communications site, wherein the first and the second communications sites communicate using the server and further, wherein each communications site includes a transceiver to directly communicate with a remote unit over a wireless communication link: receiving a first message at the server from a steward associated with the first communications site that supports telecommunications for at least a first remote unit whose home communications site is the first communication site, the first message requesting at least one address associated with the at least a second communications site that is associated with a call group from which the first remote unit has requested to receive telecommunications content, communicated through a logical port at the first communications site and maintaining the logical port open for at least a minimum period; receiving a second message at the server from an envoy associated with the second communications site that brokers call setup between the first remote unit and the steward, the second message requesting an identifier associated with the first communications site; and the server communicating a third message to the first communications site through the logical port to facilitate peer-to-peer communications between the first and the second communications site, the third message identifying the second communications site as a candidate for establishing a peer-to-peer communications link with the first communications site resulting in a peer-to-peer communications link being established between the first communications site and the second communications site, wherein the peer-to-peer communications link does not rely on the server for transporting packets between the first communications site and the second communications site.

2. The method of claim 1, wherein communicating the third message comprises communicating an identifier associated with the envoy.

3. The method of claim 1, further comprising receiving a fourth message from the first communications site, the fourth message requesting at least one address associated with at least a second communications site that is associated with a call group from which the first remote unit has requested to receive telecommunications content.

4. The method of claim 3, wherein receiving the fourth message comprises receiving the fourth message from a steward associated with the first communications site, the steward supporting telecommunications for at least the first remote unit.

5. The method of claim 3, further comprising:
processing the fourth message to identify the at least one requested address based upon an identifier associated with the call group; and
communicating to the first communications site a fifth message comprising the at least one requested address.

6. The method of claim 3, further comprising receiving at least a fifth message requesting a connection to at least a second remote unit associated with the call group.

7. The method of claim 6, further comprising communicating at least a sixth message to at least the second communications site requesting a distribution reservation for telecommunications content generated by the at least second remote unit.

8. A method for supporting telecommunications over a wide area network, comprising: at a server existing between a first and at least a second communications site, wherein the first and the second communications sites communicate using the server and further wherein each communications site includes a transceiver to directly communicate with a remote unit over a wireless communication link: receiving a first message at the server from a steward associated with the first communications site that supports telecommunications for at least a first remote unit whose home communications site is the first communication site, the first message communicated through a logical port at the first communications site and maintaining the logical port open for at least a minimum period, the first message requesting at least one address associated with the at least a second communications site that is associated with a call group from which the first remote unit has requested to receive telecommunications content; receiving a second message at the server from an envoy associated with the first communications site that brokers call setup between the first remote unit and the steward, the second message comprising the at least one address and requesting a connection to at least a second remote unit associated with the call group; and the server communicating at least a third message to the at least second communications site through a logical port to facilitate peer-to-peer communications between the first and the second communications site, the third message resulting in a peer-to-peer communications link being established between the first communications site and the second communications site, wherein the peer-to-peer communications link does not rely on the server for transporting packets between the first communications site and the second communications site.

9. The method of claim 8, further comprising:
processing the first message to identify the at least one requested address based upon an identifier associated with the call group; and
communicating to the first communications site a fourth message comprising the at least one requested address.

10. A method for supporting telecommunications over a wide area network, comprising: facilitating, by a server, communication between a plurality of communication sites comprising at least a first communications site and a second communications site; communicating a first message to the server from a steward associated with the first communications site that supports telecommunications for at least a first remote unit whose home communications site is the first communication site, the first message requesting at least one address associated with the at least a second communications site that is associated with a call group from which the first remote unit has requested to receive telecommunications content, communicated through a logical port at the first communications site; receiving a second message from the server at the first communications site through the logical port, the second message maintaining the logical port open for at least a minimum period; receiving through the logical port at the first communications site a third message from the server, the third message comprising an identifier associated with the second communications site with which a first remote unit has become affiliated; and receiving a fourth message at the first communications site from an envoy associated with the second communications site that brokers call setup between the first remote unit and the steward, the fourth message requesting registration of the second communications site with the first communications site and establishing a peer-to-peer communications link between the first and the second communications sites over which telecommunications content is communicated to the first remote unit wherein the peer-to-peer communications link does not rely on the server for transporting packets between the first communications site and the second communications site.

11. The method of claim 10, wherein the fourth message requests registration of an envoy of the second communications site with a steward of the first communications site, the steward supporting telecommunications for at least a first remote unit whose home communications site is the first communications site, and the envoy supporting telecommunications for the first remote unit while the first remote unit is affiliated with the second communications site.

12. The method of claim 10, further comprising, at the first communications site, communicating a fifth message from the first communications site to the second communications site, the fifth message acknowledging registration of the first communications site with the second communications site.

13. The method of claim 10, further comprising:
at the first communications site receiving a fifth message that indicates that the first remote unit requests to receive telecommunications content communicated by members of at least one call group; and
communicating at least a sixth message to an intermediary requesting a connection to at least a second remote unit associated with the call group.

14. The method of claim 13, further comprising:
requesting at least one address associated with at least one member of the call group;
wherein communicating the sixth message to the intermediary comprises communicating the requested address.

15. A method for supporting telecommunications over a wide area network, comprising: at a second communications site, wherein the second communications site communicates with another communications site via a peer-to-peer connection facilitated by a server, and further, wherein each communications site includes a transceiver to directly communicate with a remote unit over a wireless communication link: receiving at an envoy associated with the second communication site, from a first remote unit a first message requesting affiliation with the second communications site, wherein the first message is communicated directly over the wireless communication link, the first remote unit having a first communications site as its home communications site; communicating to the server a second message, the second message indicating that the envoy associated with the second communications site requests the identifier of the home steward of the first remote unit wherein the home steward is associated with the first communication site ;receiving a third message at the envoy associated with the second communications site with the identifier of steward of the first remote unit wherein the steward is associated with the first communication site; communicating by the envoy associated with the second communications site that brokers call setup between the first remote unit and the steward a fourth message, the fourth message requesting registration of the second communications site with the first communications site to establish a peer-to-peer communications link between the first and second communications sites over which telecommunications content is communicated wherein the peer-to-peer communications link does not rely on the server for transporting packets between the first communications site and the second communications site.

16. The method of claim 15, further comprising communicating a fifth message from the second communications site, the fifth message requesting registration of the second communications site with the first communications site.

17. The method of claim 15, wherein the first message comprises receiving the first message at an envoy associated with the second communications site, the envoy brokering call setup between the first remote unit and a steward associated with the first communications site.

* * * * *